United States Patent [19]

Garczynski

[11] 4,088,265

[45] May 9, 1978

[54] ADAPTABLE MARK/HOLE SENSING ARRANGEMENT FOR CARD READER APPARATUS

[75] Inventor: John S. Garczynski, Norristown, Pa.

[73] Assignee: Peripheral Dynamics, Inc., Norristown, Pa.

[21] Appl. No.: 690,264

[22] Filed: May 26, 1976

[51] Int. Cl.² ............................................. G06K 7/10
[52] U.S. Cl. .................................................. 235/454
[58] Field of Search .................. 235/61.11 E, 61.7 B, 235/61.12 R, 61.1; 250/566, 568, 569; 340/173 LT, 146.3 K, 146.3 Z, 149 A

[56] References Cited

U.S. PATENT DOCUMENTS 3,655,945  4/1972  Bowen ................................ 235/61.1

Primary Examiner—Robert M. Kilgore

Attorney, Agent, or Firm—Woodcock, Washburn, Kurtz & Mackiewicz

[57] ABSTRACT

Card reader apparatus having efficient means for reading information carried by paper cards or the like in the form of punched holes, marks, or both holes and marks. A dual LED light source configuration cooperates with a single light sensitive element to provide for sensing of light transmitted through punched holes in cards transported through the reader, or light reflected from the transported cards. The light sensitive element is incorporated into a simple signal processing circuit which is enabled to generate like output signals corresponding to the sensing of either marks or holes. A novel switching arrangement modifies both the energization of the light source arrangement and the polarity of the electrical supply connected to the processing circuit so as to enable utilization of the simple processing circuit in the operation of the card reader in any one of the reading modes.

20 Claims, 5 Drawing Figures

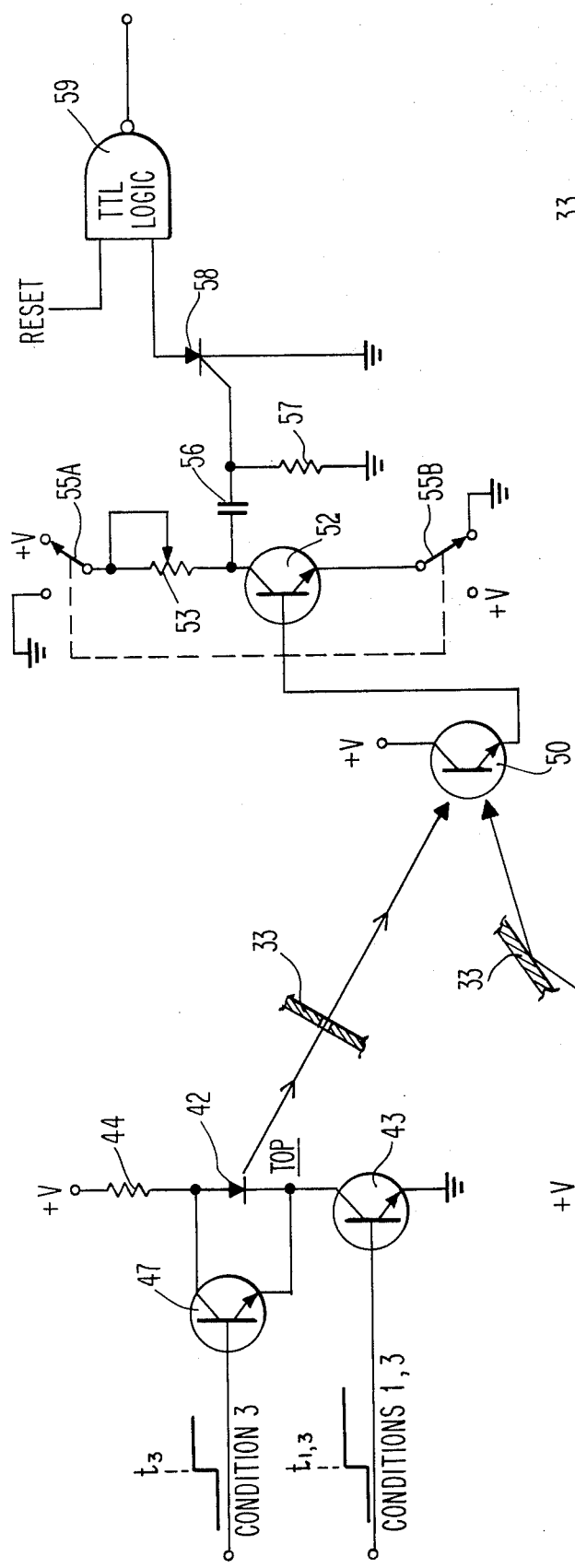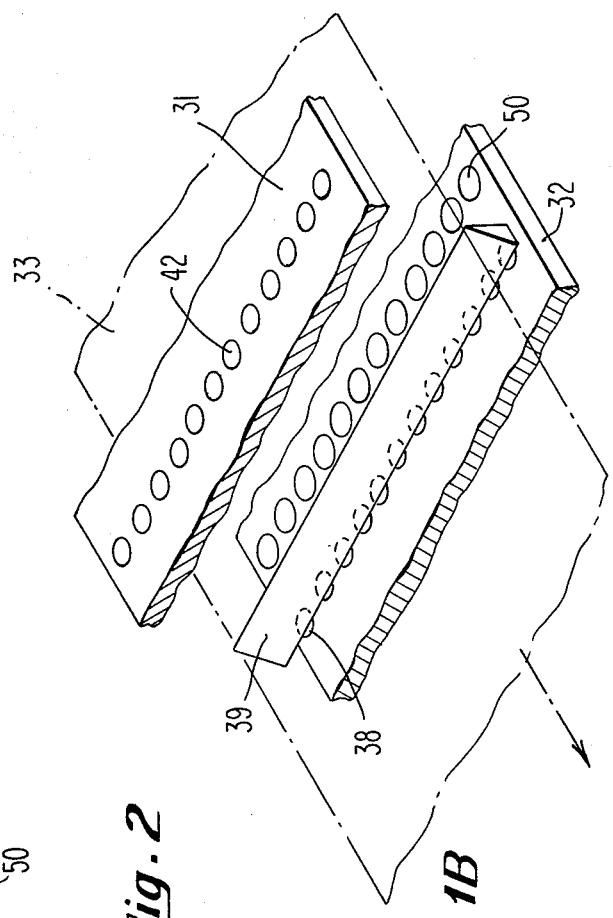
Fig. 2
Fig. 1B

ADAPTABLE MARK/HOLE SENSING ARRANGEMENT FOR CARD READER APPARATUS

REFERENCE TO RELATED APPLICATIONS

The following United States patent application is incorporated by reference:

Card Reader System With Improved Interface, invention of John S. Garczynski, Charles C. Jablanofsky and Joseph P. Murray, Ser. No. 690,261, filed May 26, 1976 and assigned to the same assignee.

BACKGROUND OF THE INVENTION

1. Field of the Invention

This invention relates to card reading devices and the like for use in electronic data processing and, more particularly, to photo-electric data reading arrangements and signal generating circuitry useful in combination therewith, for card reading apparatus adapted to read information in the form of punched holes, marks, and both holes and marks.

2. Description of the Prior Art

Prior art card readers have for some time now utilized highly efficient light sources such as LEDs in combination with photosensitive components such as phototransistors, for the detection of information encoded onto paper cards, i.e., punched holes and marks. Techniques for utilizing such efficient components in a highly efficient and reliable form have been worked out and incorporated widely into card readers and other forms of optical reading equipment used in the data processing industry. However, due to the nature of the difference between the manner in which cards are encoded with hole and mark information respectively, generally card reading devices are designed as either punched hole readers, or mark sense readers.

In order to enhance the adaptability, and accordingly the usefulness, of card readers, the industry has called for card reader models which are designed with a capability of reading either type of encoded information. As a general proposition, such plural-mode card readers generally incorporate a combination of the sensing and detection arrangements as are used separately in standard hole and mark type readers respectively. The utilization of a single, as opposed to plural, sensing arrangement for the detection of either holes or marks is clearly a desirable design achievement in the card reader industry. However, the nature of the optical signals conventionally generated for the two different modes of encoded data has not heretofore permitted a completely satisfactory solution, e.g., a design which approaches the ideal of having a single read circuit of the same simplicity and reliability as used in either a prior art punched hole reader or a prior art mark sense reader.

In addition to the hole sensing mode and mark sensing mode of operation, there is a need for a card reader which is adapted to simultaneously read both hole and mark information. In many situations, cards may be first processed such that information is encoded in a limited number of columns in a first manner, e.g., punched holes, and at some later time information is encoded in other columns in a second manner, e.g., marks. For whatever reasons the user may have for encoding the information in one mode or the other, or both, it is highly desirable to have the card reader incorporate the capability of sensing and accurately reading any one of the three modes, which capability is embodied in an efficient and reliable manner.

SUMMARY OF THE INVENTION

It is a primary object of this invention to provide a card reader having capability for reading encoded card information in any one of at least three modes.

It is a further object of this invention to provide apparatus and means for reading cards which are encoded with punched holes, marks, or a combination of holes and marks, which apparatus employs basically a single sensing circuit such that the apparatus need not incorporate distinct sensing means corresponding to each respective mode of reading.

It is a further object of this invention to provide a card reader for plural mode card reading, the reader having means for coordinated switching of the light source and signal detection circuitry whereby a single detection circuit is utilized for reading in three different modes.

In accordance with the above objectives, there is provided card reading apparatus for reading cards with information encoded thereon in a plurality of modes, having means for generating light signals representative of the information encoded on said cards, and transducer means for transforming the light signals into electrical data signals, the transducer means having a plurality of switchable connections whereby it has respective different performance characteristics, and mode selection means operable automatically or manually to act on both the read means and transducer means so as to provide for at least three different modes of card reading.

BRIEF DESCRIPTION OF THE DRAWINGS

FIG. 1B is a perspective schematic drawing showing the arrangement of the bank of light sources and detecting elements as used in the card reader apparatus of this invention.

FIG. 2 is a circuit diagram showing the signal generating and detecting circuit of the preferred embodiment of this invention.

DESCRIPTION OF THE PREFERRED EMBODIMENT

Figure 1A:
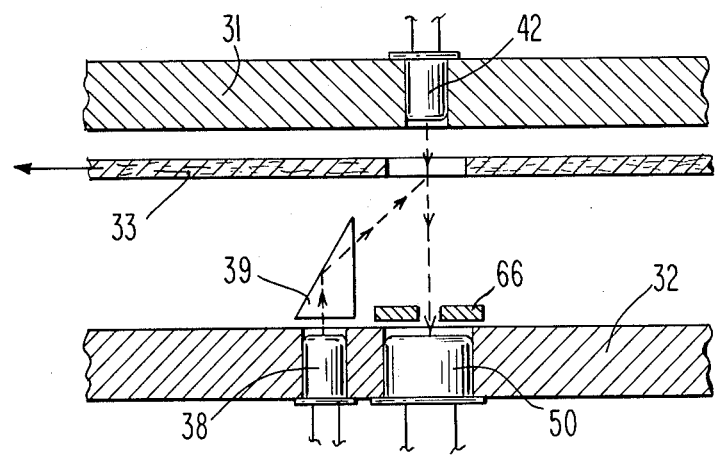
FIG. 1A is a schematic side view showing the arrangement of the optical sensing elements of the card reader of this invention.

In the description that follows, the apparatus and method of this invention are illustrated using a number of terms which are widely used in the art, as well as certain ones which are defined specifically for purposes of illustration in this specification. For example, the apparatus is described as being applicable to the reading of "cards", and it is to be understood that the term card as used in this application refers not only to conventional paper cards as used widely in data processing, but also other types of paper, cardboard, plastic and mylar stock, tags, data forms and badges, etc., and including anything which can be physically encoded in a manner similar to the manner in which regular data processing cards are processed by punching holes and making marks thereon. Likewise, reference is made to different "modes" of encoding and reading information. The "transmissive" mode as used herein refers to the mode where holes are punched in the paper cards, and during the card reading operation the cards are read by sensing when light is transmitted through a punched hole as the card is passed through the reader element of the card reader. The "reflective" mode of operation refers to encoding of information on the card by marking the card, as with a graphite pencil or ball point pen, and in this mode of operation reading is suitably performed by sensing the difference in light reflected from the card as the mark is passed through the read station. The "reflective" mode also refers to the read operation where the paper card may be encoded with both holes and marks, and the reading operation embodies sensing the presence of both holes and marks as the card is passed through the reader. The term "pulse", as used herein, refers generally to a reasonably abrupt change in the value of a signal, either light or electrical, as caused when light from an emitter source briefly passes through a punched hole in a card and is detected by a photosensitive device such as a phototransistor, resulting in a change in the electrical characteristics of the phototransistor for a short time duration, which in turn results in a short time duration change in voltage or current at the designated output of the card reader circuit. The term pulse as used herein thus generally refers to a short time duration change in value of a signal, and may be either negative going or positive going and is not limited to any precise values in terms of differential in time or magnitude.

In the illustration of this invention as follows, the card reader itself, as designated number 60 in FIG. 4, may be any type of conventional card reader in terms of its other components. For example, there is no limitation on the type of transport mechanism that is utilized, and the illustration of this invention assumes that the card reader incorporates an efficient transport mechanism for passing the cards through the read station. Reference is made to U.S. Pat. No. 3,975,010, as illustrating a card reader transport mechanism. The card reader may be a conventional type reader having an input hopper and an output hopper, or it may be a "one-at-a-time" reader wherein single cards are fed into the reader, read, and outputted either into an output hopper or back through the input port. In general, the novel reading and sensing arrangement of this invention embraces any and all card reader environments and systems.

Referring now to FIGS. 1A and 1B, the basic arrangement of the reading elements as utilized in this invention is indicated in schematic form. A card 33 is passed between upper and lower plates 31 and 32 respectively. Upper plate 31, as illustrated specifically in FIG. 1B, contains a row of light source elements 42, each element 42 being suitably a light emitting diode (LED). Lower plate 32 has positioned therein a row of light sensing elements 50, which are mounted directly vertically below the LEDs 42 and in registry with them so that when a hole appears in the card which is passing through the read station, as illustrated in FIG. 1A, light is transmitted directly through the holes in both the card and aperture 66 to the mated receiving element 50. The aperture is necessary to provide greater resolution for both a hole in the card or for a pencil mark on the card. Element 50 is suitable a phototransistor. Displaced laterally to one side of the row of receiving transistors 50 is a second row of light sources 38, also housed within plate 32 below and underneath the position where the cards 33 pass. The LEDs 38 provide light which is directed through a prism 39 to the same point on the passing cards as the incident light from elements 42 passes. When a card is in the station and being read, and no hole or mark appears between elements 42 and 50, light from LED 38 and prism 39 is reflected off the paper card and is received at element 50. The surface of a paper card is such that light is scattered at it is reflected from it, and the difference of such reflected light caused by a hole or mark is readily detectable by sensor 50. If a hole is present, for the duration of the hole the light from source 38 is transmitted through the hole instead of being reflected. Likewise, when a mark appears on the underside of the card, the dark mark decreases the amount of reflected light, and this likewise is sensed at element 50 as a decrease in reflected light, thus decreasing the conductivity of element 50 for the duration of the mark.

The utilization of the prism 39 enables the easy and efficient mounting of a second row of LEDs for use with the single row of phototransistors. With this arrangement, bottom LEDs and phototransistors can be mounted on a single P.C. board. The prism is suitably mounted at its ends, by conventional means not shown. It is to be understood that equivalent optical means such as optic fibers, mirrors and the like may be used to perform the same function as prism 39, the key to the arrangement being the utilization of optic means to direct the light from sources 38 so that the row of sources 38 can be mounted substantially alongside the row of sensing devices 50. Thus, the light signal generating arrangement constitutes a single row of sensing elements 50, suitably 12 in number corresponding to the 12 rows of a standard paper card, and two rows of light source elements, one positioned above, or on the other side of the card which is being transported through the reader, and the other being positioned below such card, e.g., next to the light sensing devices.

Referring now to FIG. 2, there is shown a circuit diagram which embodies the preferred circuitry for generating and detecting signals corresponding to encoded card information, and processing such signals to provide suitable output pulses. Each top LED 42 is connected in a series circuit between a power source V, which series circuit includes resistor 44 and gating transistor 43, the emitter of transistor 43 being suitably tied to ground. When transistor 43 is biased into an on state, as is indicated for conditions 1 and 3, the series circuit is enabled such that LED 42 is energized and produces light which is directed down from above the passing cards. The intensity of the light generated by LED 42 may be modified by turning on transistor 47 which is connected in shunting relationship across LED 42. When transistor 47 is gated on by the application of a positive bias at its base, as indicated for condition 3, it provides a shunt path which bleeds current around LED 42, such that the output intensity of the light from LED 42 is diminished.

Each bottom LED 38 is connected in a similar series circuit, being in series with a supply V, a load resistor 37 and a gating transistor 36. When transistor 36 is turned on by application of a forward bias at its base, as indicated for conditions 2 and 3, LED 38 is energized, producing light which is transmitted through prism 39 such that it may be reflected toward phototransistor 50.

As discussed in detail hereinbelow, the bias conditions of the light source circuit correspond to respective different modes of card reading. For normal operation, corresponding to any selected mode, the bias conditions for each gating transistor are the same for all similar transistors in each top and bottom array. That is, all of the top LEDs are either on or off, and all of the top LEDs either are or are not shunted by the gates 47.

Figure 3:
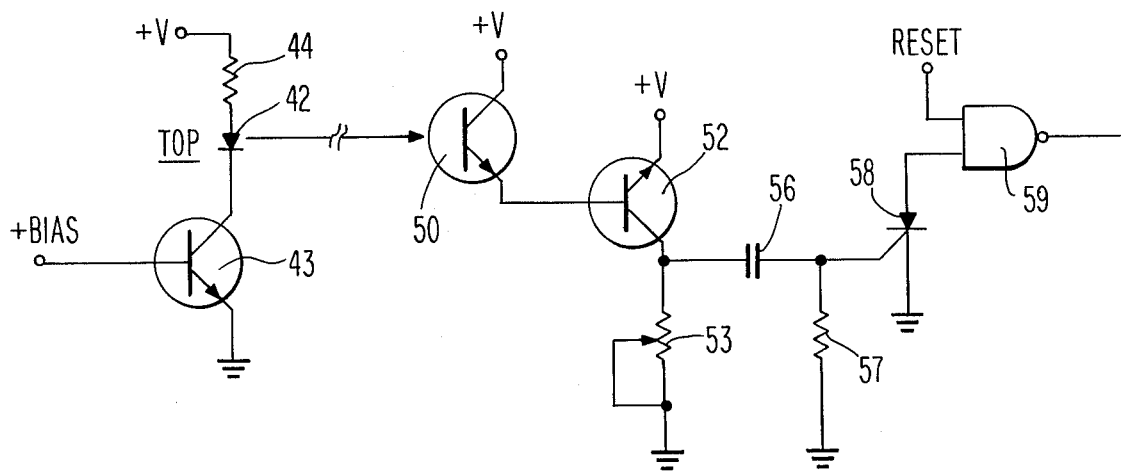
FIG. 3 is a circuit diagram showing the arrangement of the circuit of FIG. 2 when in the mode for reading cards encoded with hole information only.

Still referring to FIG. 2, and now looking at the right hand portion which comprises the detection circuitry, a phototransistor 50 is shown having its collector connected to a positive power supply and its emitter connected to the base of transistor 52. The biasing of phototransistor 50 is not shown, but it is biased in a conventional manner such that it is conductive, or turned on, corresponding to the amount of light incident upon it. Transistor 52 is incorporated into a series circuit including pot resistor 53, the series circuit being connected through switches 55A and 55B between power supply V and ground. The polarity of the connection depends upon the positioning of the switches, such that the collector may be connected to the plus supply and the emitter to ground, as shown, or the emitter to the plus supply and the collector to ground. The polarity of the connection will, as is well known, substantially affect the operation of the transistor. For a typical transistor as used in this application, the $H_{FE}$ is about 150 for the switch arrangement as illustrated in FIG. 2, and about 2 for the opposite connection, which opposite connection is illustrated in FIG. 3.

The detection circuit arrangement of FIG. 2 detects differences in reflected light ("reflective mode"), the relatively low level differences corresponding to pencil marks on the card being offset by the high gain condition of transistor 52. The detection circuit arrangement of FIG. 3 detects differences in transmitted light ("transmissive mode"), the relatively high level differences corresponding to holes in the card being offset by the low gain condition of transistor 52. In addition, the two different detection circuit arrangements of FIGS. 2 and 3 provide the phase inversion which is necessary for proper data detection in these two operating modes. This phase inversion is necessary due to the differences in polarity of the data pulses as they appear at phototransistor 50. In "transmissive mode", a hole in the card (data bit), will cause an *increase* in light current in phototransistor 50. In "reflective mode", a hole in the card, or pencil mark on the card (data bit) will cause a *decrease* in light current in phototransistor 50. The detection circuit arrangement of FIG. 2 ("reflective mode") causes a high gain amplification and phase inversion at transistor 52, since in this mode, transistor 52 is connected as a common emitter amplifier. The detection circuit arrangement of FIG. 3 ("transmissive mode") causes a low gain amplification and no phase inversion at transistor 52, since in this mode, transistor 52 is connected as an emitter follower. Thus, the proper amplitude levels, and pulse polarities are obtained at the output of transistor 52, regardless of the reading mode selected ("transmissive or reflective") through the simple switch arrangement shown in FIG. 2 at 55A and 55B.

The collector of transistor 52 is connected to capacitor 56, the other side of capacitor 56 being connected through resistor 57 to ground. The combination of elements 56 and 57 comprises a differentiation circuit, which is useful in discriminating true marks on cards from smudges, in that it passes only reasonably well defined marks which produce a substantial leading edge in the detected signal. This feature is particularly useful in discriminating against marks which have been placed on a paper card and then erased, where frequently the erasure is not complete and a darkened portion is left on the card. However, even though there is a decrease in the intensity of the reflected light, due to the erasure there is an insubstantial leading edge, such that the erasure is not detected.

The junction of elements 56 and 57 is connected to the gate of SCR 58, the anode of which is connected as one input to TTL logic gate 59, the desired TTL level output signal appearing at the output of gate 59. SCR 58 will remain conducting once it has been triggered, until it is turned off by reducing the current flow therethrough below a minimum conductance level. This is achieved when a reset signal is inputted to a second input of gate 59, whereupon the gate is opened, closing off conduction through SCR 58. The reset signal is suitably generated within the card reader in a conventional fashion. Reference is made to U.S. Pat. No. 3,660,698, assigned to the same assignee as this application, for a prior art example of utilization of reset signals in card readers for resetting SCRs. It is to be noted that the SCR provides memory of the column which has just been read, which memory is maintained until the SCR is reset.

FIG. 3 shows the same detection circuit as illustrated in FIG. 2, except that the circuit is shown under the circumstance that switches 55A and 55B are positioned so that the emitter of transistor 52 is connected to the positive supply, and resistor 53 is connected to ground. As discussed hereinabove, in this arrangement the gain of the transistor is much lower than when it is connected in the conventional manner and no phase inversion is provided.

The unique utility of the circuit arrangement of this invention is appreciated by considering how it is utilized in the three different modes of operation. These three modes are as follows:

1. Holes only are sensed. In mode 1 ("transmissive mode"), the source circuits are biased as indicated by condition 1 in FIG. 2, so that the top light source only is lit. This being the case, a hole is sensed at the photosensing element 50 as a pulse of bright light. The card itself is sensed as being dark, as is a mark. The circuit arrangement for mode 1 is illustrated in FIG. 3, where the top LED 42 only is shown as transmitting light which impinges upon transistor 50 when a hole passes between element 42 and element 50. It is to be noted that under these circumstances, the pulse of very bright light which impinges on phototransistor 50 is amplified by transistor 52 which is operating under the low-gain non-inverting condition illustrated in FIG. 3. The relatively low gain of transistor 52 cooperates with the relatively high intensity light pulse which strikes transistor 50 to produce a nominal output.

2. Marks and holes are sensed interchangeably ("reflective mode"). In mode 2, the source circuits are biased as indicated by condition 2 in FIG. 2, so that the bottom light source only is lit. Under these circumstances, phototransistor 50 senses only light which is reflected off of the bottom side of the passing card 33. Under these circumstances, when the unencoded card is passing through and there is neither a hole nor a mark, the transistor 50 senses a relatively well illuminated bright condition. However, when a hole or a mark is present, the reflected light diminishes and a dark condition is sensed, i.e., bottom light passes through the hole and is lost, or is absorbed by the pencil mark. In mode 2, switches 55A, 55B are set as indicated in FIG. 2, so that the detection circuit provides both high gain and phase inversion. The high gain is necessary in processing the relatively low level differences caused by the momentary reduction of light reflected from the card.

3. Marks only are sensed. In mode 3, the source circuits are biased as indicated by condition 3 in FIG. 2, so that both light sources are lit, meaning that both transistors 43 and 36 are forward biased. In addition, transistor 47 which shunts the top LED 42 is forward biased, thus causing a dimming of the light intensity transmitted from the top LED 42. Under these circumstances, either the reflected light from the bottom of a card in the station or the presence of a hole in the card is detected at transistor 50 as causing substantially the same degree of brightness. This is because, with LED 42 dimmed, the light which is transmitted directly through a hole approximates substantially the reflected light coming from an unmarked card. At the same time, the presence of a mark on the underside of the card is sensed as a dark condition, due to the reduction of reflected light, such that only the presence of a mark is sensed as causing a difference at transistor 50. In mode 3, switches 55A, 55B are again set as indicated in FIG. 2, so that the detection circuit provides high gain and phase inversion.

In summary, each of modes 1, 2 and 3 may be selected by biasing the light emitting circuitry and the detecting circuitry so as to obtain the desired combination of light source and signal detection circuitry. While the switch arrangement for selecting the polarity of energization of the detection circuit, as seen in FIG. 2, is a preferred embodiment, it is to be understood that the switching may be done by other means. For example, the mode selection may be made by received signals from an external source, which received signals are connected through appropriate logic circuitry to gate the detection circuit to the desired polarity supply. Likewise, the bias conditions as are illustrated as being applied to the control transistors in the light source circuitry may be established by input switches in a conventional manner, or may be established through logic circuitry and control signals applied from any desired source. By the use of high speed control circuitry, it is to be seen that mode selection may indeed even be varied during the course of reading a given card. By way of illustration, mode 1 may be selected for the reading of the first 20 columns, mode 2 selected for reading of the next 25 columns, and mode 3 selected for reading of the last 35 columns.

Figure 4:
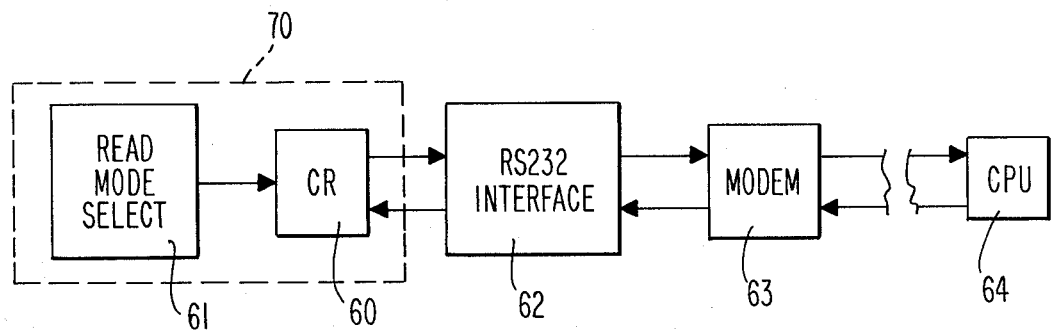
FIG. 4 is a simplified block diagram showing the arrangement of the card reader of this invention in a system wherein the card reader communicates with a central processing unit.

Referring now to FIG. 4, there is shown a simplified block diagram of a larger system incorporating a card reader containing the reading arrangement of this invention. In such a simplified system, the card reader unit 70 comprises card reader electronics 60 and read mode select means 61. The read mode select means 61 may be input buttons which are connected to switches which make the desired connections of bias voltages and supply voltages to the circuit arrangement of FIG. 2. Read mode select means 61 may alternately contain stored information and logic elements whereby the card reader unit may be preprogrammed to selectively switch modes for predetermined card columns. The card reader electronics is connected to an interface unit 62, also suitably housed within the card reader itself. The interface unit performs a number of important functions so that the card reader can interface with, i.e., be connected with a remotely positioned central processing unit (CPU) 64. The interface unit suitably carries out the function of transforming 12 bit data words to 8 bit data words, and transforming the pulse levels to a form adaptable for use by the CPU. The interface generally is connected to a modem 63, which in turn connects to the CPU. Reference is made to the aforementioned copending application Ser. No. 690,261titled Card Reader System With Improved Interface and assigned to the same assignee of this invention, for a more complete example of the functions which may be performed by an interface unit. However, for purposes of this application it is noted that with the incorporation of an interface unit into the system, commands may be sent from the card reader to the CPU, and from the CPU to the card reader. In this manner, the mode selection may be made at the CPU and transmitted through the interface to the card reader, for automatic gating of the reader circuitry so that the cards are read in the desired mode. Such commands may also suitably contain further information relating specifically to the mode of reading for each column, or groups of columns, of each card which is read. In addition, other arrangements are within the scope of this invention. For example, cards containing clock signals may be utilized, with the clock signals controlling the read mode of operation of the card reader.

I claim:

1. In a card reader adapted to operate in a plurality of reading modes for reading information encoded on cards transported therethrough, a reading assembly comprising:
   a. read means for generating first data signals in optical form representative of data encoded on cards, and having a plurality of modes of operation;
   b. transducer means for converting said first data signals to an electrical form, said transducer means having a plurality of modes of operation corresponding to said modes of operation of said read means, said transducer means having a common output circuit with a single output; and
   c. mode selection means operable on both said read means and said transducer means to provide for at least three different modes of reading.

2. The card reader as described in claim 1, wherein said read means comprises light receptor means for receiving light signals and light signal means for generating light signals, said light signal means containing a first light emitting element fixed in a first position, a second light emitting element fixed in a second position and disposed so that a card can pass between said two elements, and light directing means cooperating with said second element so that when a card is passed between said elements light signals are sensed at said light receptor means originating from either of said light elements, said sensed light signals carrying information representative of encoded information on said card, and comprising a first array of said light emitting elements fixed in a first array position, a second array of said light emitting elements fixed in a second array position, and wherein said light directing means cooperates with said first and second arrays.

3. The card reader as described in claim 2, wherein said light directing means comprises a prism.

4. The card reader as described in claim 1, wherein said transducer means comprises a common light sensitive circuit in combination with said common output circuit for producing an output signal substantially the same corresponding to detected light and dark pulses respectively.

5. The card reader described in claim 4, wherein said output circuit comprises an amplifier circuit, a differentiating circuit driven by said amplifier, an SCR driven by said differentiating circuit, and a logic gate having an input terminal connected to said SCR.

6. The card reader as described in claim 2, comprising mode selection means for selecting the mode of operation of said card reader, said mode selection means having means to vary the operation of said read means and said transducer means.

7. The card reader as described in claim 6, wherein said mode selection means comprises a switching circuit cooperating with a power supply to enable the connection of different polarity supply signals to said transducer means.

8. The card reader as described in claim 7, wherein said mode selection means includes switch means for selectively energizing the selected ones of said light arrays.

9. The card reader as described in claim 8, wherein said mode selection means comprises means for controlling the degree of energization of at least one of said light arrays.

10. The card reader as described in claim 2, wherein said mode selection means comprises means for energizing said two arrays of light emitting elements so that the light sensed at said light receptor means is substantially the same when a hole is between said arrays and when an unencoded portion of a card is between said arrays.

11. The card reader as described in claim 9, wherein said read means has direct means for transmitting light signals directly to said transducer means when a hole is positioned therebetween, and indirect means for transmitting light signals indirectly to said transducer means when an unencoded portion of a card is therebetween, and said mode selection means has means for operating on said read means so that direct transmitted and indirect transmitted signals are of substantially the same intensity at the point where received by said transducer means.

12. The card reader as described in claim 7, wherein said mode selection means comprises manually operable switches.

13. The card reader as described in claim 7, wherein said mode selection means comprises automatic means for selecting said mode as a function of received signals.

14. A system for reading information from cards and transmitting said information to an external device, comprising:
   a. a card reader adapted to transport cards therethrough, reading means for reading information encoded on said transport cards, and read mode select means for determining the mode of reading performed by said reading means;
   b. a central processing unit adapted to receive information and to transmit information;
   c. interface means for interfacing between said card reader and said central processing unit, whereby data can be transmitted between said card reader and said central processing unit;
   d. transmission means for transmitting data between said interface means and said central processing unit; and,
   e. wherein said read mode select means comprises means for adjusting the operation of said card reader so that said card reader may operate in a mode of reading selected from the modes consisting of reading holes only, reading marks only, and reading both marks and holes, and said reading means comprises a plurality of output signal circuits, each of said circuits being commonly operative to provide output signals in each of said modes.

15. The system as described in claim 14, wherein said read mode select means comprises means for changing the mode of operation of said card reading means for respective different columns of a given card being read by said card reader.

16. The system as described in claim 14, wherein said card reading means comprises at least one array of light emitting elements in combination with an array of light sensitive elements, and having means for adjusting the intensity of operation of said light emitting elements as a function of the mode of reading selected.

17. In a card reader for reading cards encoded with data in the form of holes, marks, or holes and marks, and having read means with a plurality of light sources for generating light signals representative of said encoded data and a signal generating circuit for generating electrical signals representative of said light signals, a method for reading holes, marks, and holes and marks, comprising:
   a. energizing a portion of said signal generating circuit with a first polarity and energizing a first group of said light sources, thereby to read holes only in said cards;
   b. energizing said portion of said signal generating circuit with a second polarity and energizing a second group of said light sources, thereby to read holes and marks in said cards; and
   c. energizing said portion of said signal generating circuit with said second polarity and energizing both said groups of said light sources, thereby to read marks only in said cards.

18. The method of claim 17, comprising decreasing the energization of said first group of light sources when reading marks.

19. In a card reader for reading in the transmissive mode, the reflective mode, or concurrently in both the transmissive and reflective modes, a light signal transducer circuit, comprising:
   a. a single transducer, for transforming light signals into electrical signals;
   b. a single signal processing circuit, for processing said electrical signals to provide data signals;
   c. power means; and
   d. mode selection means for selecting the operating mode of said reader, said mode selection means including correcting circuitry, for applying power to said single signal processing circuit.

20. The card reader as described in claim 19, wherein said connecting circuitry includes switch means for connecting said power with a switchable polarity.

* * * * *